United States Patent [19]
Hackl et al.

[11] Patent Number: 5,853,064
[45] Date of Patent: Dec. 29, 1998

[54] STEERING SYSTEM FOR A MOTOR VEHICLE

[75] Inventors: Matthias Hackl, Vaihingen; Wolfgang Kraemer, Stuttgart, both of Germany

[73] Assignee: Robert Bosch GmbH, Stuttgart, Germany

[21] Appl. No.: 772,508

[22] Filed: Dec. 24, 1996

[30] Foreign Application Priority Data

Jan. 19, 1996 [DE] Germany ............................ 196 01 825

[51] Int. Cl.⁶ ...................................................... B62D 6/06
[52] U.S. Cl. .............................. 180/422; 180/446; 701/42
[58] Field of Search ...................................... 180/421, 422, 180/446; 701/41, 42

[56] References Cited

U.S. PATENT DOCUMENTS 5,032,999  7/1991  Finger et al. .............................. 701/42
5,182,711  1/1993  Takahashi et al. ....................... 180/446
5,205,371  4/1993  Karnopp .................................. 180/79.1

*Primary Examiner*—Kevin Hurley
*Attorney, Agent, or Firm*—Baker & Daniels

[57] ABSTRACT

A steering system for a motor vehicle comprising at least one steered wheel, an actuator motor and an actuator, wherein the steering movement initiated by the driver of the vehicle and the movement initiated by the actuator motor are superimposed by the actuator to generate a movement of the steered wheel. The actuator motor is activated for movement by a manipulated variable that depends at least on the steering movement initiated by the driver. Significant for the invention is that the manipulated variable is limited in magnitude. The difference between the manipulated variable and a restricted manipulated variable in parallel through an integrated stage and is superimposed upon the manipulated variable to prevent the vibration of a released steering wheel.

20 Claims, 7 Drawing Sheets

STAND DER TECHNIK
PRIOR ART

STEERING SYSTEM FOR A MOTOR VEHICLE

BACKGROUND OF THE INVENTION

1. Field of the Invention

The invention relates to a steering system for a motor vehicle.

2. Related Art

A steering system is known from DE-OS 40 31 316 (corresponding to U.S. Pat. No. 5,205,371) and, as far as relevant for understanding the present invention, illustrated with the aid of FIGS. 1 and 2. The steering movements, or steering wheel angles $\delta_L$, applied in such a steering system by the driver through the steering wheel 11, are in the actuator 12, superimposed with the movements of the actuator motor 13, or motor angle $\delta_M$. The overall movement thus created, for instance the angle $\delta_L'$, is transmitted via the steering gear 14 or steering linkage 16, respectively, to the steered wheels 15a and 15b for adjustment of the steering angle $\delta_V$. The actuator motor 13, may be configured as an electric motor. The functional principle of such power steering system is that the steering can be made very indirect by the gear ratio $i_{\ddot{u}}$ of the actuator 12, thereby achieving smaller steering wheel moments $M_L$. Very large steering wheel angles $\delta_L$ caused thereby are avoided by superimposition of suitable actuator motor angles $\delta_M$ allowing adjustment of initial angles $\delta_L'$ required with steering angles of usual magnitude, according to the relationship $\delta_L' = \delta_L/i_{\ddot{u}} + \delta_M$. The motor angle $\delta_M$ necessary for steering assist or its set value, respectively, is determined from the steering wheel angle $\delta_L$. The steering wheel in such power steering systems tends to vibrate in the released state, especially at standstill of the vehicle, so that audible vibrations of the steering wheel may occur with sufficiently strong stimulation.

The objective of the present invention consists in controlling, or regulating, the power steering system to the effect that no appreciable vibrations will be audible.

SUMMARY OF THE INVENTION

As mentioned above, the invention is based on a steering system for a motor vehicle comprising at least one steered wheel, an actuator motor and an actuator, wherein the steering movement initiated by the driver of the vehicle and the movement initiated by the actuator motor are superimposed by the actuator to generate the steering movement of the steered wheel. To initiate actuator motor movement, the actuator motor is activated by a manipulated variable that depends at least on the steering movement initiated by the driver. Essential for the invention is that said manipulated variable is limited in its magnitude.

The limitation of the manipulated variable (generally a motor current limitation) represents the major cause of the vibration tendency of the steering wheel, that is, the fact that the motor current can assume only certain values and therefore, as the case may be, cannot reach its set value. This cause is compensated for by a specific extension of the controller according to the invention.

The core of the invention consists in reproducing the limitation of the manipulated variable for the actuator motor in the controller and feeding the difference between an ideal and a restricted manipulated variable back in integrated fashion, and as the case may be, amplified. This brings about, while the limitation is effective, the integration of an offset and its addition to the ideal manipulated variable, the result of which is that the ideal manipulated variable is able to escape the limitation more quickly. The aforementioned vibration tendency of the released steering wheel is effectively avoided thereby.

One provision, specifically, is superimposing the difference between the restricted manipulated variable and the ideal manipulated variable in additive fashion upon the restricted manipulated variable by way of an integrating member.

As long as the limitation is not effective, the inventional offset remains constant, so that an offset, once created, leads to subsequent permanent control deviations. To avoid such permanent control deviations, care is taken in the following embodiments of the invention that the offset tends toward zero while the limitation is not effective. To realize this idea, essentially five options are named in the following for alternative or combined application.

The first option consists in the negative feedback of the value formed in the integrating member, i.e., of the offset, to the integrator input. That is, the difference or the amplified difference is reduced by the difference passed through the integrating member or by the amplified difference passed through the integrating member. A provision may be that said negative feedback of the integrator occurs with the amplification factor $\alpha > 0$. This embodiment has the advantage that this measure for avoiding the permanent control deviation influences in the case of a small amplification factor $\alpha$ the effect of the inventional avoidance of steering wheel vibrations only insignificantly.

A further option for avoiding the permanent control deviations consists in performing a negative feedback of the integrator, as the case may be, with the amplification factor $\alpha > 0$, only whenever the limitation is ineffective. This results in a reduced offset with a first-order delay behavior.

A further option for elimination of the permanent control deviation consists in ramping the difference passed through the integrating member, prior to the superimposition of the unlimited control signal, at a specific preset speed to the value zero, and at that, whenever the magnitude of the manipulated variable is not restricted, that is, whenever the manipulated variable limitation is ineffective.

Another option of avoiding the aforementioned permanent control deviation consists in passing the difference routed through the integrating member prior to superimposition with the unrestricted manipulated variable signal through a delay component with a second-order delay behavior when the magnitude of the manipulated variable is not restricted, that is, whenever the manipulated variable limitation is ineffective.

A last option that is provided according to the invention for elimination of the permanent control deviation is passing the difference channeled through the integrating member or, as the case may be, the amplified difference passed via the integrating member through another amplifier stage and superimposing it after such amplification of the difference between the unrestricted and the restricted manipulated variable signal. This embodiment, notably with a small amplification factor $\alpha > 0$, results as well in an only insignificant influencing of the inventional avoidance of the steering wheel vibrations of the released steering wheel. Further favorable embodiments derive from the subclaims.

BRIEF DESCRIPTION OF THE DRAWINGS

FIG. 4 shows with the aid of a block diagram in exemplary fashion the control or regulation, respectively, while

DETAILED DESCRIPTION OF THE PREFERRED EMBODIMENT

The invention is described hereinafter with the aid of an exemplary embodiment.

Figure 1:
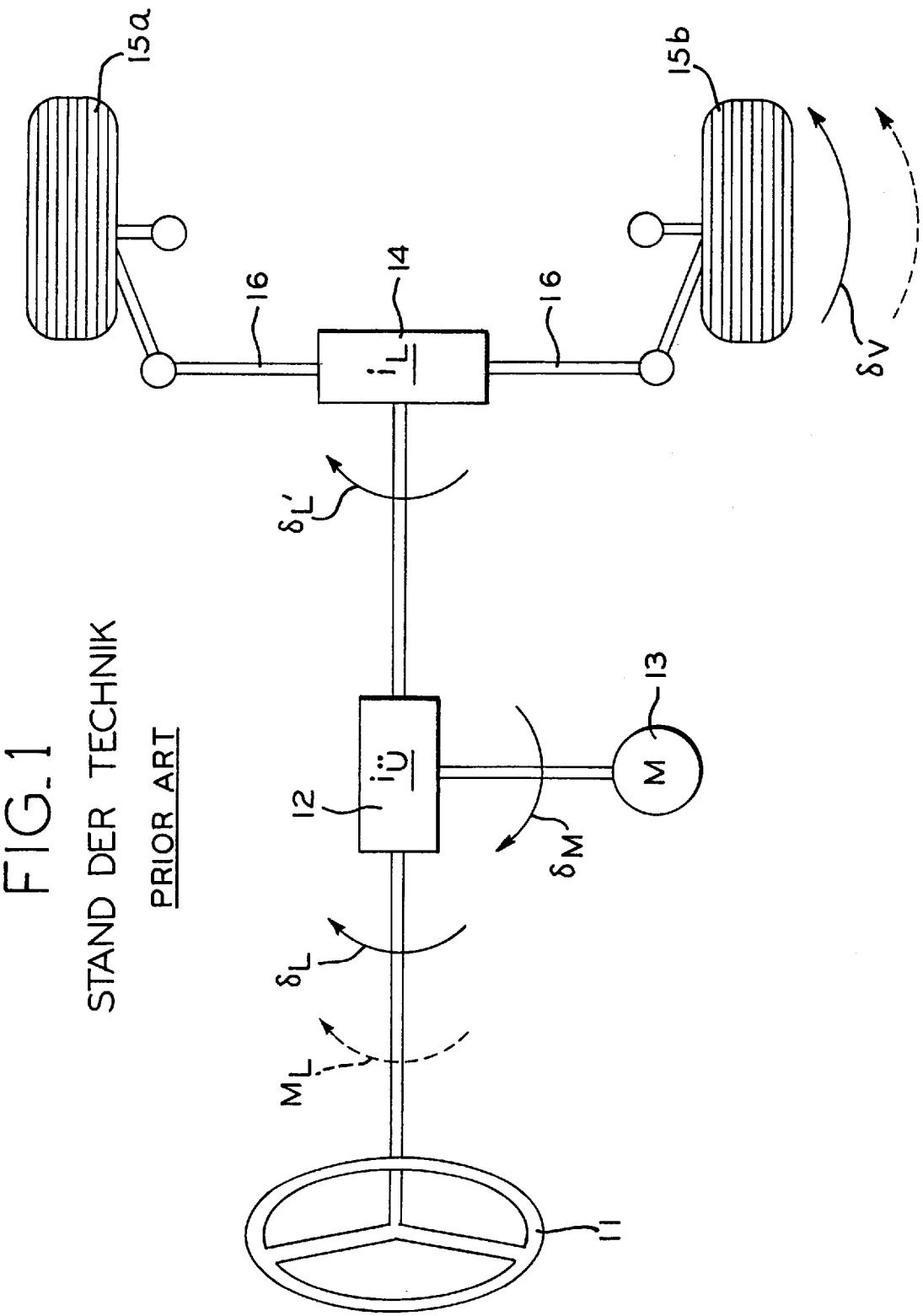
FIGS. 1 and 2 show schematically the steering system on which the invention in the exemplary embodiment is based.

As briefly mentioned above, FIGS. 1 and 2 show a steering system according to the prior art, on which the present exemplary embodiment is based.

Figure 3A:
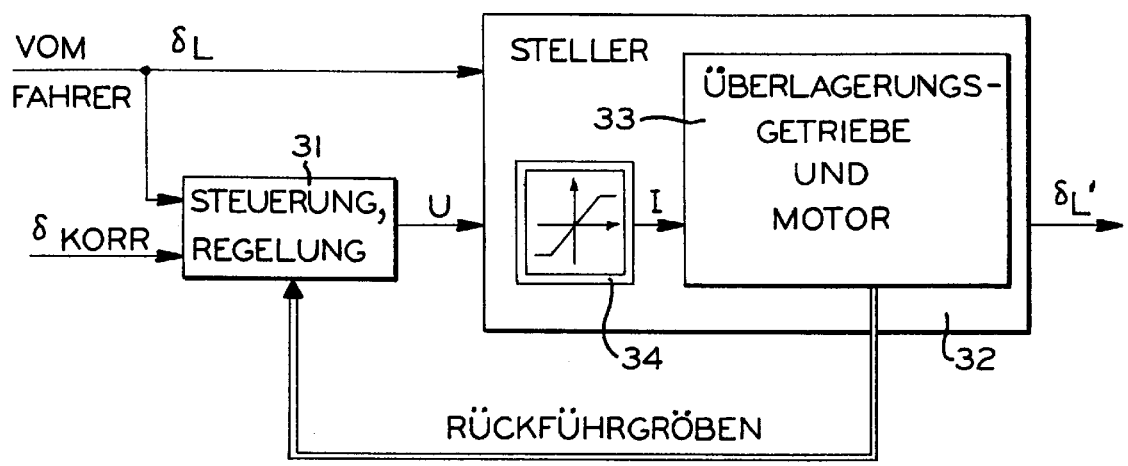
FIG. 3 shows in its parts a and b a block diagram of the steering system; for one, in the case of a steering wheel gripped by the driver (FIG. 3a) and in the case of a released steering wheel (FIG. 3b).
Figure 3B:
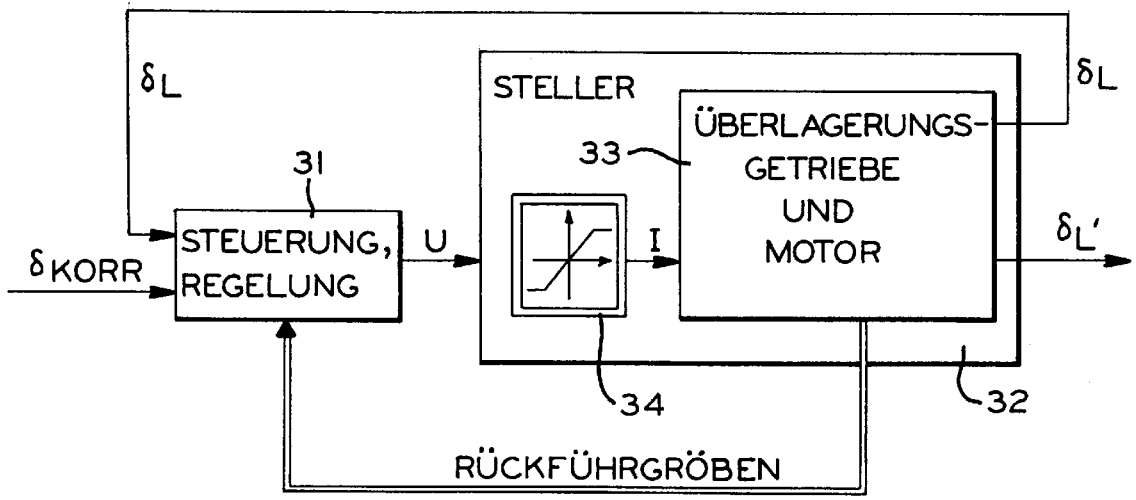

FIG. 3a shows the basic structure of the control and regulation of the power steering system in the state of the gripped steering wheel, whereas FIG. 3b deals with the situation in the state of the released steering wheel. To that end, block 33 combines schematically the actuator 12, and the actuator motor 13. Block 32 signifies the active component consisting of the actuator and actuator motor 33 and the manipulated variable restriction 34, which actually is a property of the actuator motor 33. Fed to the control, or regulator, 31 proper, on its input end (FIGS. 3a, b) are the steering wheel angle $\delta_L$ and the additional steering intervention $\delta_{korr}$. The additional controller input $\delta_{korr}$ serves the superimposition of corrective dynamic steering interventions. Envisaged here, e.g., are steering shares that depend on the state of travel (vehicle speed, yaw movements or instabilities cause by side winds). Furthermore, as regards the corrective steering intervention $\delta_{korr}$, reference is made to the description of the vehicle controller 44 (FIG. 4).

Depending on the above steering angle signals and feedbacks, the control signal u is by means of the control, or regulator, 31 fed back to the active component 32. Named as feedback quantities, e.g., are the actual angular position of the actuator motor 13, and the momentary actual value for the motor current. In addition to feeding the steering wheel angle $\delta_L$ to the control or regulator, respectively, 31, the steering wheel angle is fed also, directly, to the actuator 12. The active component superimposes the steering wheel angle $\delta_L$ initiated by the steering wheel and the steering angle $\delta_M$ initiated by the actuator motor, or electric motor 13, respectively, by means of the actuator 12. On the output of active component 32 or actuator 12, respectively, is then the steering movement $\delta_L'$ after superimposition. Overall, it follows thus from FIG. 3a to activate the actuator motor 13, depending on the steering wheel angle and, as the case may be, depending on a corrective dynamic steering intervention.

FIG. 3b shows the power steering system with the steering wheel released. The state of the released steering wheel is characterized in that the steering wheel angle $\delta_L$ is an output quantity of the active component 32 and is not preset by the driver, creating in addition to the controller feedback a further closed-loop active circuit. This circuit tends to vibrations attributable for the most to a manipulated variable restriction, that is, to the fact that the motor current I that powers the actuator can assume only limited values and therefore, as the case may be, cannot reach its set value. Therefore, the invention proposes to use a control that makes allowance for the manipulated variable restriction.

Figure 2:
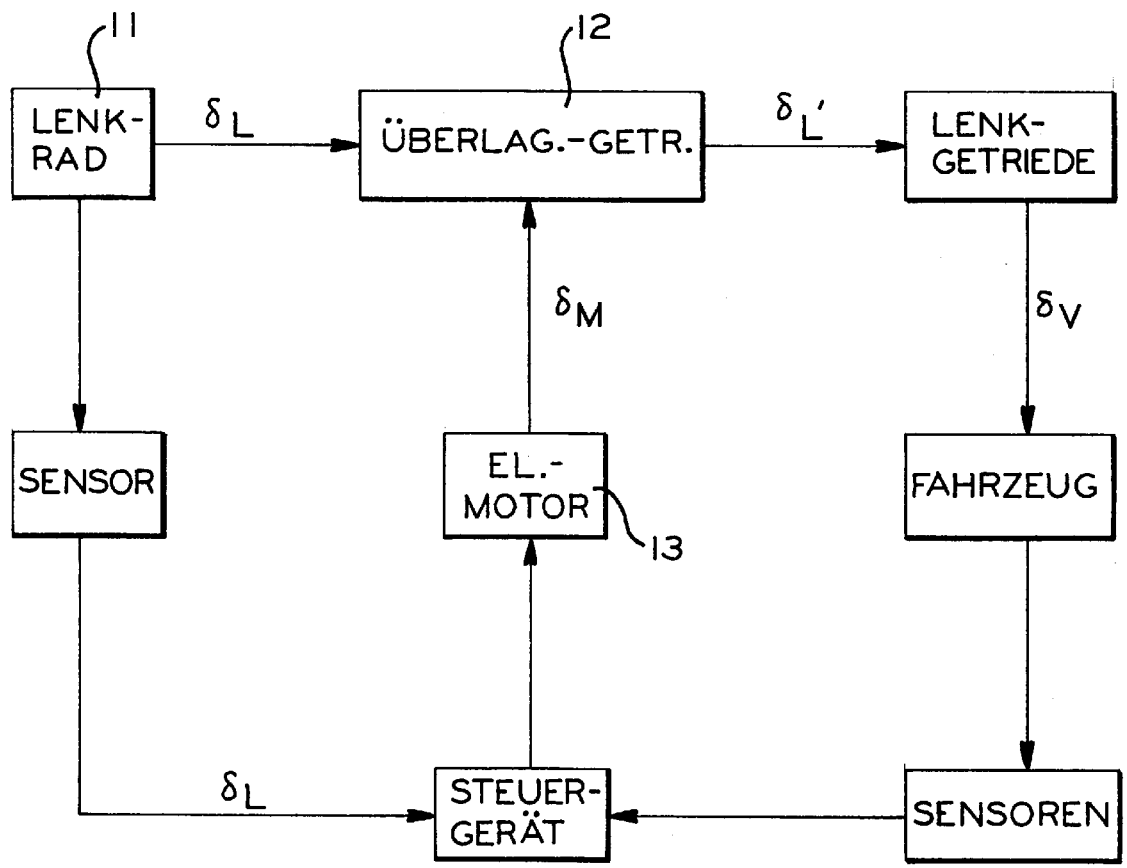
Figure 4:
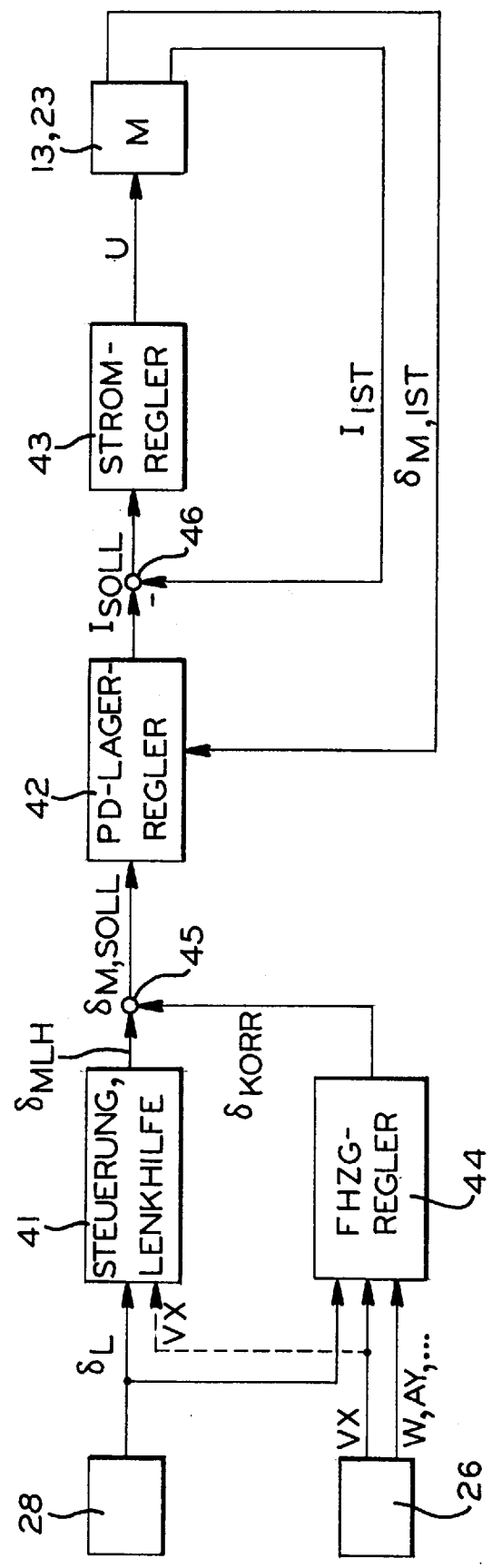

FIG. 4 shows the arrangement of the control and regulator which in the normal operation, i.e., with the steering wheel gripped, results in the intended operation of the servo system. To that end, the steering angle $\delta_L$ preset by the steering wheel and sensed (sensor 28 in FIG. 2) and, optionally, the linear velocity $V_X$ of the vehicle are fed to the power steering control 41. The corrective steering intervention $\delta_{korr}$ is determined in the vehicle regulator 44, depending on the signals of the sensors 26 (FIG. 2). For that purpose, e.g., the previously mentioned vehicle linear velocity $V_X$, the yaw angle velocity $\omega$ and/or the transverse acceleration $a_y$ of the vehicle can be sensed. Aside from the corrective steering intervention $\delta_{korr}$, the set value $\delta_{MLH}$ for the motor angle is determined, as mentioned, with the aid of the power steering control from the steering wheel angle $\delta_L$. Determined, for one, by the power steering control and, for another, by the vehicle control, the set values are at the connection point 45 added to the set motor angle $\delta_{M,soll}$. The motor angle $\delta_M$ is updated to its set value $\delta_{M,soll}$ with the aid of a position controller 42. To that end, the momentary actual value $\delta_{M,ist}$ of the motor angle is fed to the position controller 42 as input signal. The output signal $I_{soll}$ of position controller 42 is the set value for the current controller 43. For current control, the set value of the motor current is at point 46 compared with the momentary actual value $I_{ist}$ of the motor current, and the difference is fed to the current controller 43 to form control signal u of the actuator motor 13. The current controller 43 features a manipulated variable restriction, since the motor current, naturally, is limited. This leads to the restricted manipulated variable $I_{soll}$. Shown in FIG. 4, this structure is characterized, in addition to its simplicity, in that it contains no dynamic controller shares, notably no I-shares.

Figure 5A:
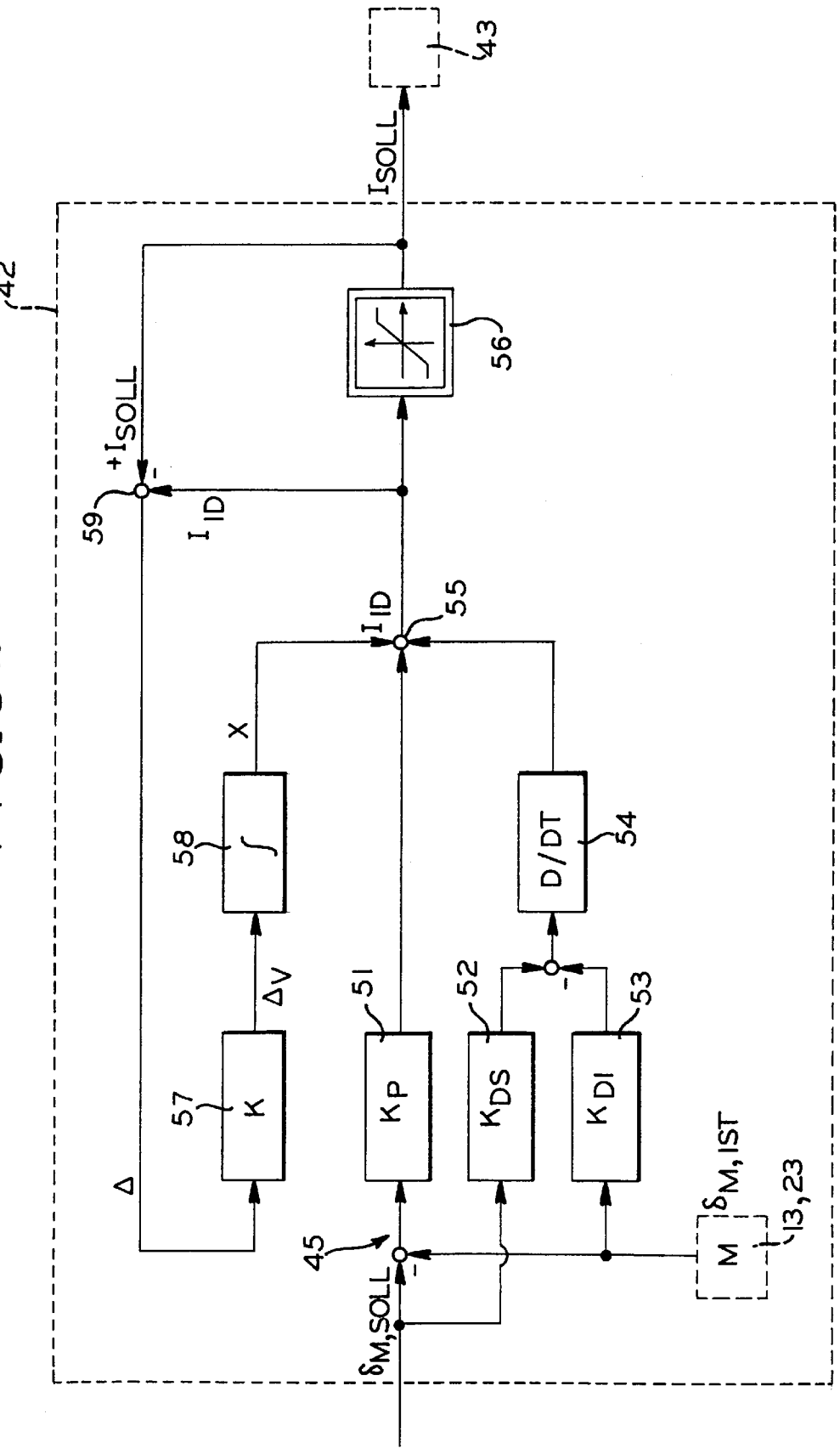
FIG. 5a depicts with the aid of a block diagram the inventional control strategy in exemplary manner.

To reduce the vibration tendency with the steering wheel released, due to the manipulated variable restriction 34, an extension of the PD position controller 42 is proposed, such as shown in FIG. 5a. The PD position controller 42 itself features the P-amplification $K_p$ (unit 51) and is able to weigh the set/actual value ($\delta_{M,soll}$, $\delta_{M,ist}$) derivations with different amplification factors $K_{Ds}$, or $K_{Di}$ (units 52 and 53). The proportionally amplified set value is now linked at the connection point 55 with the mentioned, differently weighted time derivations, forming the ideal manipulated variable $I_{id}$ (ideal motor current). This ideal manipulated variable $I_{id}$, however, must be limited in the manipulated variable restricting unit 56 to the restricted manipulated variable $I_{soll}$ which represents the set current value $I_{soll}$ of the motor or current controller 43, respectively.

The core of the invention now consists in reproducing the current limitation 34 of the motor in the controller as unit 56 and feeding the difference between the restricted manipulated variable $I_{soll}$ and the ideal manipulated variable $I_{id}$, respectively, back in integrating fashion with the amplification κ. To that end, the difference Δ between the restricted and the unrestricted (ideal) manipulated variable is formed in the connection point 59. Upon passage through the amplifier stage 57 (amplification by the value κ), the difference $\Delta_V$ thus amplified is passed to the integrator 58, obtaining the offset x. This offset x is added to the (unrestricted) ideal manipulated variable $I_{id}$. While the restriction 56 is effective, an offset x is thereby integrated and added to the ideal manipulated variable $I_{id}$, the effect of the offset being that the manipulated variable escapes the restriction more quickly.

Figure 5B:
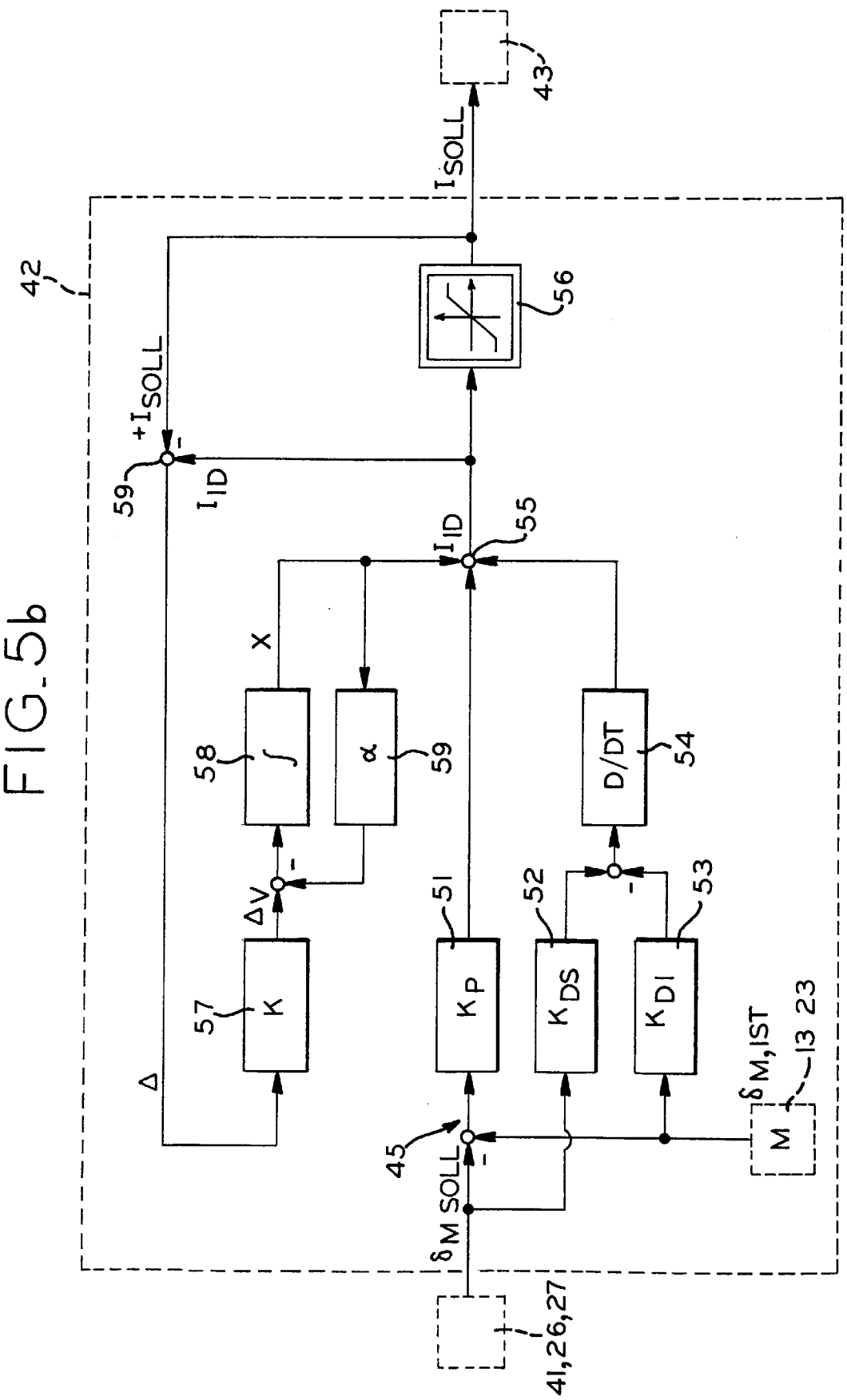
FIGS. 5b and 5c show improvements of the inventional control strategy.

As long as the restriction 56 is not effective, the offset x remains constant, so that, once created, an offset x leads then to a permanent control deviation. To avoid such permanent control deviation, care must be taken to have the offset tend toward zero while the restriction 56 is not effective. Available therefor are several options, which will be addressed hereafter:

1. In FIG. 5b, the offset x is in addition to the circuit shown in FIG. 5a fed back before the integrating stage 58 by way of amplifier stage 59. Achieved thereby is a permanent negative feedback of the integrator 58 with the amplification factor $\alpha>0$; that is, the integrator is substituted by a first-order delay member. The offset x tends thus at disappearing difference $\Delta$ toward zero. If the offset is not zero, the offset x does no longer grow without restriction, but this measure influences at a small amplification factor $\alpha$ the effect of the inventional avoidance of steering wheel vibrations only insignificantly.

Figure 5C:
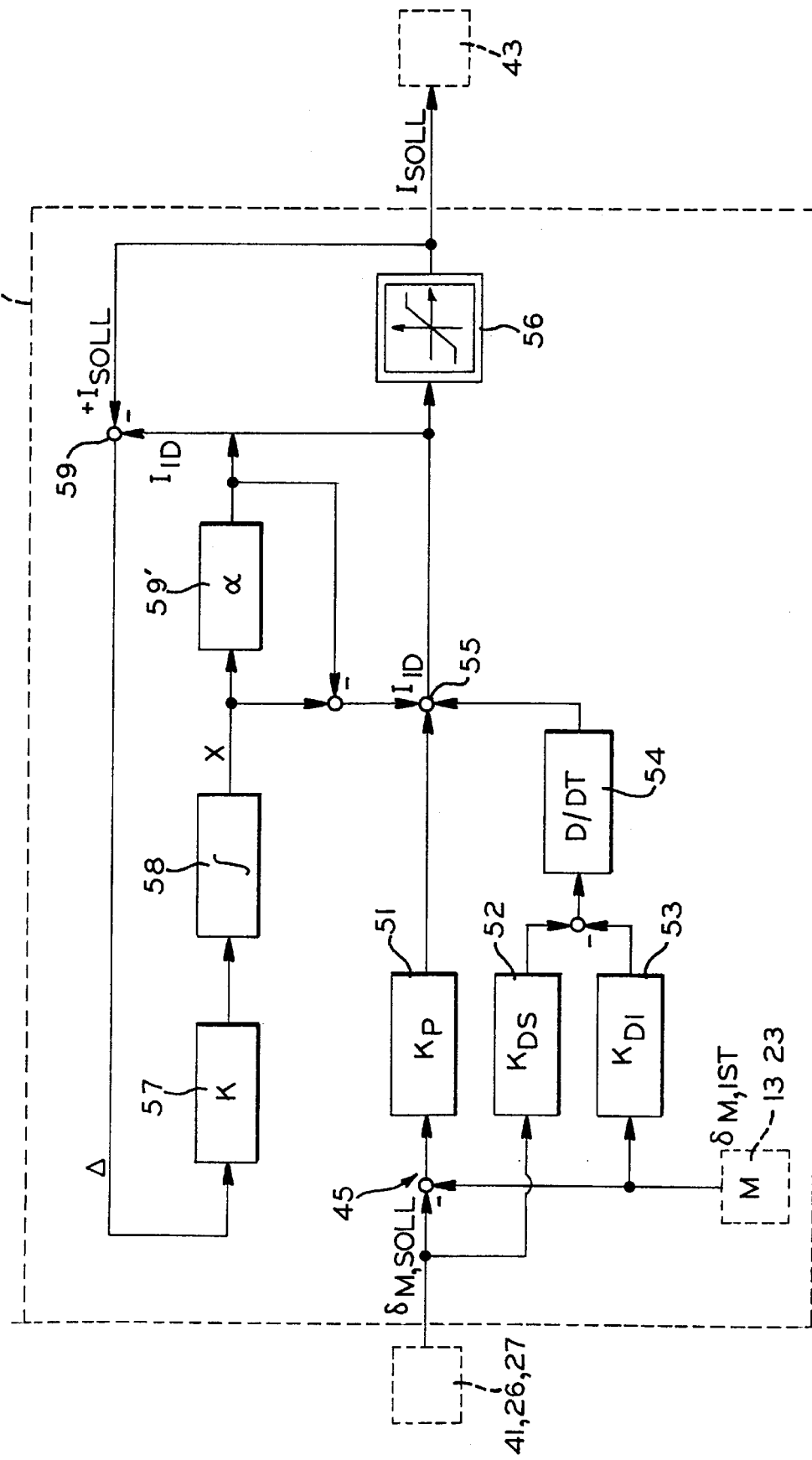

2. In FIG. 5c, the controller according to FIG. 5a is modified to the effect that the offset x is by way of the amplifier stage 59' utilized for difference formation between the restricted and the unrestricted manipulated variable signal. Furthermore, the offset signal amplified by the amplifier stage 59' is subtracted from the original offset signal x. The modification of the controller as illustrated in FIG. 5c accomplishes the effect that offset x tends toward zero with a first-order delay behavior only when the difference $\Delta$ disappears; that is, the restriction is not effective. With the restriction effective, the offset can grow without restriction. With small amplification factors $\alpha>0$, only insignificant influences on the inventional avoidance of steering wheel vibrations occur as well.

3. For avoiding the mentioned permanent control deviations, a negative feedback of the integrator 58 (FIG. 5b) can be provided for only when the restriction 56 is ineffective. That is, when the (unrestricted) ideal manipulated variable $I_{id}$ equals the restricted manipulated variable $I_{soll}$. This results in a reduction of the offset x with a delay behavior of first order.

4. A further option for suppression of the permanent control deviation consists in ramping the offset x back to the value 0 with a specific, preset velocity while the restriction 56 is not effective.

5. A reduction of the offset x with a delay behavior of second or higher order may as well be provided for while the restriction 56 is not effective.

The above third, fourth and fifth measures do not influence the effect of the inventional steering wheel vibration suppression. With these measures it is possible, additionally, to commence with the reduction of the offset x not immediately upon termination of the effectiveness of the restriction 56, but only a certain time thereafter.

When the maximum value of the physical manipulated variable restriction 34, or 56, is not constant, the inventional steering wheel vibration suppression can be improved by reproducing said variable maximum value also in the controller. Specifically, this is the case whenever the maximum motor current depends on the motor speed.

A further variant of the inventional steering wheel vibration suppression consists in forgoing the reproduction of the restriction in the controller and, instead of the restricted manipulated variable $I_{soll}$ according to FIG. 5a, 5b and 5c, utilizing a measurement of the real manipulated variable, in the present exemplary embodiment of $I_{ist}$ in FIG. 4. A prerequisite is that no large dynamic delays exist between the ideal set value and the measured restricted value.

In addition to the inventional system, the behavior of the power steering system at released steering wheel can be improved further still by a suitable entering of the angular velocity $d\delta_L/dt$ or $d\delta_L'/dt$ at the free input $\delta_{korr}$. These entries may be effective as well only temporarily.

In summary, it can be said regarding the invention that a control is concerned here that allows for the current limitation in order to prevent vibrations of the released steering wheel. Proposed to that end is an extension of a PD position controller, that is, of a static controller, for making allowance for the manipulated variable restriction. This inventional extension of the controller does not affect the regular function of the power steering system with the steering wheel gripped. The invention provides a simple controller for analog or digital realization. Inventionally extended, the PD position controller can be used also in other cases in which a manipulated variable restriction causes vibration problems. Presented were different options for taking the offset created by the inventional steering wheel vibration suppression back to zero. This enables a sensitive adaptation of the inventional extension to the respective requirements.

The vibration tendency of the steering wheel is given at the same extent when using a cascade control instead of a PD motor position servomechanism (without the inventional steering wheel vibration suppression).

We claim:

1. Steering system for a motor vehicle, comprising: a steering wheel; a steered wheel; an actuator motor; and an actuator having a plurality of inputs and an output, said steering wheel operatively connected to one of said actuator inputs, said actuator motor operatively connected to another of said actuator inputs, said steered wheel operatively connected to said actuator output, said steered wheel having movement responsive to a steering wheel movement and actuator motor movements, said actuator motor movement responsive to a manipulated variable signal, said manipulated variable signal responsive in part to said steering movement, said manipulated variable limited in magnitude said manipulated variable signal including a superimposed signal, said superimposed signal comprising a difference signal passed through an integrating stage, said difference signal comprising a difference of said manipulated variable signal and a restricted manipulated variable signal.

2. Steering system according to claim 1, wherein said manipulated variable comprises an additive combination of said superimposed signal.

3. Steering system according to claim 1, wherein said difference signal comprises said difference of said manipulated variable signal and a restricted manipulated variable signal passed through an amplifier stage.

4. Steering system according to claim 1, further comprising an amplified difference signal, said amplified difference signal comprising a difference of said difference signal and an integrated difference signal, said superimposed signal comprising said amplified difference signal passed through an integrating stage.

5. Steering system according to claim 4, wherein said amplified difference signal comprises said superimposed signal passed through a further amplifier stage.

6. Steering system according to claim 4 wherein said amplified difference signal comprises a difference of said difference signal and an integrated difference signal, when said manipulated variable has unrestricted magnitude.

7. Steering system according to claim 1, wherein said difference signal is ramped back to zero at a specific, preset velocity when said manipulated variable has unrestricted magnitude.

8. Steering system according to claim 1, wherein said difference signal is taken back to zero value via a delay member with a delay behavior of second or higher order when said manipulated variable has unrestricted magnitude.

9. Steering system according to one of the claims 1, wherein said difference signal includes in part a further signal corresponding to said difference signal passed through a further amplifier stage.

10. Steering system according to claim 1, wherein said manipulated variable depends on a time derivation of the actual value of said actuator movement and a time derivation of an appropriate set value each said time derivation weighed with different amplification factors.

11. A method for controlling a steering system, comprising the steps of:

providing a steering wheel, a steered wheel, an actuator and an actuator motor operatively connected together;

forming a manipulated variable signal to actuate the movement of the actuator motor, the manipulated variable signal responsive in part to a movement of the steering wheel initiated by a driver, said forming step comprising forming a difference signal corresponding to the difference between a manipulated variable signal and a restricted manipulated signal;

passing the difference signal through an integrating stage to form an integrated difference signal;

superimposing the integrated difference signal with the manipulated variable signal to form the manipulated variable signal;

activating the actuator motor in response to the manipulated variable signal; and using the actuator to apply a steered movement to the steered wheel based on the movement of the steering wheel and the movement of the actuator motor.

12. The method of controlling a steering system according to claim 11, wherein said step of superimposing comprises adding said integrated difference signal with said manipulated variable.

13. The method of controlling a steering system according to claim 11, wherein said step of forming a difference signal comprises passing the difference signal through an amplifier stage to form an amplified difference signal.

14. The method of controlling a steering system according to claim 11, wherein said step of forming a manipulated variable further comprises forming a reduced difference signal by reducing the difference signal by the integrated difference signal.

15. The method of controlling a steering system according to claim 14, wherein said step of forming a reduced difference signal comprises reducing the difference signal by an amplified integrated signal, the amplified integrated signal corresponding to the integrated difference signal passed through a further amplifier stage.

16. The method of controlling a steering system according to claim 14, wherein said step of forming a reduced difference signal is performed if the manipulated variable has unrestricted magnitude.

17. The method of controlling a steering system according to claim 11, further comprising the step of ramping the difference signal back to a value of zero at a specific, preset velocity when the manipulated variable has unrestricted magnitude.

18. The method of controlling a steering system according to claim 11, further comprising the step of taking the difference signal back to a value of zero via a delay member with a delay behavior of second or higher order when the manipulated variable has unrestricted magnitude.

19. The method of controlling a steering system according to claim 1, wherein the step of forming a difference signal comprises superimposing a further amplified difference signal on the difference signal.

20. The method of controlling a steering system according to claim 1, wherein said step of forming a manipulated variable signal comprises forming the manipulated variable signal based on a time derivation of an actual value corresponding to the movement of the actuator and a time derivation of an appropriate set value, each said time derivation weighed with different amplification factors.

* * * * *

UNITED STATES PATENT AND TRADEMARK OFFICE
CERTIFICATE OF CORRECTION

PATENT NO. : 5,853,064
DATED : December 29, 1998
INVENTOR(S) : Matthias Hackl et al It is certified that error appears in the above-identified patent and that said Letters Patent is hereby corrected as shown below:

Claim 9, Col. 6, Line 64, delete "one of the claims" and insert --claim--.

Signed and Sealed this

Eleventh Day of May, 1999

*Attest:*

Q. TODD DICKINSON

*Attesting Officer*      *Acting Commissioner of Patents and Trademarks*